US009195878B2

(12) United States Patent
Weber

(10) Patent No.: US 9,195,878 B2
(45) Date of Patent: Nov. 24, 2015

(54) METHOD OF CONTROLLING AN ELECTRONIC DEVICE

(71) Applicant: FINGERPRINT CARDS AB, Gothenburg (SE)

(72) Inventor: Sebastian Weber, Malmo (SE)

(73) Assignee: FINGERPRINT CARDS AB, Gothenberg (SE)

( * ) Notice: Subject to any disclaimer, the term of this patent is extended or adjusted under 35 U.S.C. 154(b) by 0 days.

(21) Appl. No.: 14/558,008

(22) Filed: Dec. 2, 2014

(65) Prior Publication Data

US 2015/0269409 A1    Sep. 24, 2015

(30) Foreign Application Priority Data

Feb. 21, 2014  (SE) .................... 1450208-2

(51) Int. Cl.
*G06F 3/041* (2006.01)
*G06K 9/00* (2006.01)
*G06F 3/044* (2006.01)

(52) U.S. Cl.
CPC ............ *G06K 9/00067* (2013.01); *G06F 3/044* (2013.01); *G06K 9/00013* (2013.01)

(58) Field of Classification Search
USPC ........... 235/380; 340/5.83; 345/173; 382/124
See application file for complete search history.

(56) References Cited

U.S. PATENT DOCUMENTS

| 6,408,087 | B1 | 6/2002 | Kramer |
| 8,006,099 | B2 | 8/2011 | Aoyama et al. |
| 2001/0036299 | A1* | 11/2001 | Senior ........................ 382/124 |
| 2004/0263487 | A1* | 12/2004 | Mayoraz et al. ............. 345/173 |
| 2009/0225049 | A1* | 9/2009 | Liu et al. ....................... 345/173 |
| 2011/0175703 | A1 | 7/2011 | Benkley |
| 2012/0306769 | A1* | 12/2012 | Zhu et al. ..................... 345/173 |
| 2013/0076485 | A1* | 3/2013 | Mullins ....................... 340/5.83 |
| 2013/0160087 | A1* | 6/2013 | Davis et al. ...................... 726/4 |
| 2014/0026208 | A1 | 1/2014 | Coons |
| 2014/0035826 | A1* | 2/2014 | Frazier et al. ................ 345/173 |
| 2015/0042575 | A1* | 2/2015 | Dong ............................ 345/173 |
| 2015/0186004 | A1* | 7/2015 | Gordon ........................ 345/173 |

* cited by examiner

*Primary Examiner* — Daniel Hess
(74) *Attorney, Agent, or Firm* — Remarck Law Group PLC

(57) ABSTRACT

The present invention relates to a method of controlling an electronic device, the electronic device comprising a fingerprint sensor. The fingerprint sensor is typically comprised with a user input device providing a possible compliment and/or addition to a user input device provided with the portable electronic device. Advantages with the invention include simplified user control of the portable electronic device. The invention also relates to a corresponding electronic device and to a computer program product.

15 Claims, 5 Drawing Sheets

METHOD OF CONTROLLING AN ELECTRONIC DEVICE

CROSS-REFERENCE TO RELATED APPLICATIONS

This application claims the benefit of Swedish Patent Application No. 1450208-2, filed Feb. 21, 2014. The disclosure of the above application is incorporated herein by reference in its entirety.

TECHNICAL FIELD

The present invention relates to a method of controlling an electronic device, the electronic device comprising a fingerprint sensor. The invention also relates to a corresponding electronic device and to a computer program product.

BACKGROUND OF THE INVENTION

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important issues.

Typically, the fingerprint sensor is solely used for providing increased security, for example for unlocking the electronic device. However, it may also be possible to use the fingerprint sensor for controlling the X-Y position of a pointer on a display by detecting motion of ridges and pores of a fingerprint of a user and moving the pointer on the display accordingly.

An example of such a system is disclosed in U.S. Pat. No. 6,408,087, the system being configured to captures successive images of the fingerprint ridges and pores and detects motion in or changes of the ridges and pores based upon the captured successive images. Specifically, successive images are captured by scanning an array of sensors, each of the sensors being smaller than the width of an individual ridge of a fingerprint. Preferably, the array of sensors is smaller than the pad of a finger of a user.

The fingerprint sensing system according to U.S. Pat. No. 6,408,087 provides for an excellent showcase of increased usefulness of a fingerprint sensor by indicating its use in relation to controlling the position of a pointer on a display. However, there appears to be room for further improvement, specifically in relation to simplified operation of the electronic device, at the same time taking into account the desire to improve the overall power consumption of the electronic device.

SUMMARY OF THE INVENTION

In view of above-mentioned and other drawbacks of the prior art, it is an object of the present invention to provide an improved electronic device configured to be at least partly controlled by use of a fingerprint sensor. In particular, the present inventors have found that the fingerprint sensor may be further integrated in the overall context of operation of the electronic device.

According to an aspect of the present invention, it is therefore provided a method of controlling a portable electronic device, the electronic device comprising a display unit configured to display a first graphical user interface (GUI), a first user input device configured to allow a user to interact with the first GUI, a second user input device comprising a fingerprint sensor having an array of pixels, the second user input device being separate from the first user input device, and a control unit configured to control the operation of the fingerprint sensor, wherein the method comprises the steps of detecting the presence of human skin using the second user input device, wherein a positive detection results in a human activity signal, receiving, at the control unit, the human activity signal, acquiring, in response to the received human activity signal, a fingerprint image using the fingerprint sensor, extracting a verification representation of the fingerprint image, comparing the verification representation to a pre-stored fingerprint template, if the comparing step results in a match repeatedly detecting the presence of human skin at the second user input device to determine duration of contact, if the duration of contact is determined to be shorter than a predefined time allowing access to the portable electronic device, and allowing the user to interact with the first GUI using the first user input device, if the duration of contact is determined to be longer than the predefined time allowing access to the portable electronic device, and allowing the user to interact with the first GUI using the second user input device by repeatedly acquiring fingerprint images using the fingerprint sensor and comparing successively acquired fingerprint images to detect a direction of movement over the fingerprint sensor.

The present invention is based upon the realization that a portable electronic device may be provided with more than one single input device for control of a thereto related first GUI, where one of the input devices comprises a fingerprint sensor with the purpose of allowing access control of the electronic device as well as for navigation within the first GUI. In addition, the portable electronic device may possibly be kept in a first state with focus on low power consumption, and transition to a second fully operational state only once a human activity at the second user input device is detected.

Accordingly, advantages with the invention includes simplified user control of the portable device, which may be made active (transition from the low power mode), accessible (for example "unlocked") and interacted with (using the second user input device and the first GUI) in case the user keeps a finger positioned at the fingerprint sensor for a duration being longer than the predefined time.

Conversely, for controlling the portable electronic device using the first user input device, the first user input device for example being a touch screen arranged with the display unit, the user simply keeps a finger positioned at the fingerprint sensor for a duration being shorter than the predefined time. Accordingly, it is desirable to tune the predefined time to correspond to an indication of which of the user input devices that should be used for navigating the first GUI. Thus, the predefined time may be configured by the user and may as such be adjusted as desired. In a general implementation of the invention, the predefined time may be pre-set to around 2 seconds. However, the predefined time may be both shorter and longer and may possibly be depending on the typical time for verification of a fingerprint.

In a possible alternative embodiment of the invention, an in comparison long duration for activating with the second user input device could additionally include a "double tap" or "double click" on the fingerprint sensor. Thus, the dual touch on the surface of the fingerprint sensor will be additionally comprised in the step of presence of human skin at the second user input device to determine duration of contact.

According to the invention, the control unit is preferably an ASIC, a micro processor or any other type of computing device for controlling the operation of the fingerprint sensor. As such, the control unit may form an integral part of the second user input device. However, the control unit may also be a general control unit comprised with the portable electronic device, for example configured for controlling the overall operation of the electronic device.

The fingerprint sensor may, as indicated above, be implemented using any kind of currently or future fingerprint sensing principles, including for example capacitive, optical, or thermal sensing technology. However, at present capacitive sensing is most preferred.

As discussed above, once the presence of human skin has been detected, a human activity signal will be generated and received by the control unit. The activity signal may be configured to transition the control unit from the first state of low power consumption, where only selected portions of the control unit are active, to the second fully operational state. The activity signal may for example be configured to generate a computational interrupt (hardware/software), which in turn for example will initiate a control functionality provided with the control unit for operating the fingerprint sensor to acquire a fingerprint image.

In an embodiment of the invention, the output from the fingerprint sensor may for example be raw fingerprint image data, or the data may have been processed and may then be provided in the form of conditioned image data. For authentication purpose, a fingerprint pattern may be extracted from the fingerprint image and compared to a pre-stored fingerprint template, possible stored with the electronic device, where a positive comparison may provide access to the electronic device in a manner as mentioned above.

Furthermore, navigational control of the first GUI using the second user input device is preferably achieved by repeated acquisition of fingerprint images using the fingerprint sensor, where the successively acquired fingerprint images in turn are compared to detect how a finger is moving over the fingerprint sensor. Preferably, a disposition of ridges and pores of a fingerprint is detected in analyzing the successively acquired fingerprint images, and a corresponding movement within the first GUI may be achieved. It could also be possible to operate a "virtual" keyboard using the second user input device.

Preferably, the navigation within the first GUI may be provided by moving a pointer within the first GUI. However, depending on the context in which the first GUI is provided, for example depending on an application specific GUI, other GUI navigation possibilities may alternatively be provided. For example, in some embodiments an "arrow based" navigation may be achieve using the second input device (including for example "up", "down", "left" and "right"), for example provided in a second GUI where the second GUI is provided as an element of the first GUI. As such, the second GUI may be at least partly overlay the first GUI.

As mentioned above, the fingerprint sensor is configured to include an array of pixels for generating the fingerprint images. In a possible embodiment the fingerprint sensor is configured to include an array comprising 192×192 pixels. Any other differently sized fingerprint sensor is of course possible and within the scope of the invention. Preferably, the fingerprint sensor is capable of detecting surface relief of a finger having a depth of 1 or 2 micrometers or less. In case of applying capacitive sensing technology, each pixel includes a capacitive element and the system captures the fingerprint images by detecting changes in capacitance of the capacitive elements.

In one embodiment of the invention, it may be possible to only allow a sub-set of the pixels to be initially active, i.e. during the first low power consumption state, for detecting the presence of human skin. In such an embodiment, the combined output from one or a plurality of sub-sets of pixels may be compared to a predefined threshold, where a combined output exceeding the threshold results in generation of the human activity signal. It may be possible to allow for the use of more than one predefined threshold in the comparison, for example allowing for one specific threshold when comparing with a single sub-set of pixels and a second specific threshold when comparing the combined results from more than one single sub-set of pixels. Preferably, one single sub-set of pixels is at least 8×8 pixels. However, as understood any other differently sized sub-set may of course possible and within the scope of the invention.

In an embodiment of the invention, the GUI being navigated by the first or the second user input device is the same, and the second user input device is provided as an alternative to the first user input device when navigating the GUI. However, it may be preferred to provide a specifically adapted GUI in case of solely interaction using the second user input device. The specifically adapted GUI may, similarly as discussed above, be designed to correspond to an application specific context. For example, in one embodiment a popup may be provided within the GUI, where the popup is designed to correspond to the navigational functionality made possible using the fingerprint sensor.

In another embodiment it may also be possible to only allow access to some selected applications once the second user input device is used to control the GUI. Such applications may for example include applications with high security and/or personalization, such as for example an email client, a web browser with personalized bookmarks, etc.

Still further, in one embodiment it may also be possible to combine the navigational functionality provided using the second user input device with user interaction with the first user input device. For example, it could be possible to use the second user input device to select an object being present within a GUI (such as an element within a graphics editor) and use the first user input device to transform the object (e.g. size, rotation, color, etc.).

According to another aspect of the present invention, there is provided a portable electronic device, comprising a display unit configured to display a first graphical user interface (GUI), a first user input device configured to allow a user to interact with the first GUI, a second user input device comprising a fingerprint sensor having an array of pixels, the second user input device being separate from the first user input device, and a control unit electrically connected to the fingerprint sensor, wherein the control unit is configured to receive a human activity signal in response to human skin being detected at the second user input device, acquire, in response to the received human activity signal, a fingerprint image using the fingerprint sensor, extract verification representation of the fingerprint image, compare the verification representation to a pre-stored fingerprint template, determine duration of contact, if the comparison results in a match, in response to human skin repeatedly being detected at the second user input device, if the duration of contact is determined to be shorter than a predefined time allow access to the portable electronic device, and allow the user to interact with the first GUI using the first user input device, if the duration of contact is determined to be longer than the predefined time allow access to the portable electronic device, and allow the user to interact with the first GUI using the second user input device by repeatedly acquire fingerprint images using the fingerprint sensor and compare successively acquired fingerprint images to detect a direction of movement over the fingerprint sensor. This aspect of the invention provides similar advantages as discussed above in relation to the previous aspect of the invention.

According to a further aspect of the present invention, there is provided a computer program product comprising a computer readable medium having stored thereon computer program means for a control unit adapted for controlling a portable electronic device, the portable electronic device comprising a display unit configured to display a first graphical user interface (GUI), a first user input device configured to allow a user to interact with the first GUI, a second user input device comprising a fingerprint sensor having an array of pixels, the second user input device being separate from the first user input device, and a control unit configured to control the operation of the fingerprint sensor, wherein the computer program product comprises code for detecting the presence of human skin using the second user input device, wherein a positive detection results in a human activity signal, code for receiving, at the control unit, the human activity signal, code for acquiring, in response to the received human activity signal, a fingerprint image using the fingerprint sensor, code for extracting a verification representation of the fingerprint image, code for comparing the verification representation to a pre-stored fingerprint template, code for, if the comparing step results in a match repeatedly detecting the presence of human skin at the second user input device to determine duration of contact, code for, if the duration of contact is determined to be shorter than a predefined time allowing access to the portable electronic device, and allowing the user to interact with the first GUI using the first user input device, code for, if the duration of contact is determined to be longer than the predefined time allowing access to the portable electronic device, and allowing the user to interact with the first GUI using the second user input device by repeatedly acquiring fingerprint images using the fingerprint sensor and comparing successively acquired fingerprint images to detect a direction of movement over the fingerprint sensor. Also this aspect of the invention provides similar advantages as discussed above in relation to the previous aspects of the invention.

As mentioned above, the control unit is preferably an ASIC, a micro processor or any other type of computing device. Similarly, a software executed by the control unit for operating the inventive system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

In summary, the present invention relates to a method of controlling an electronic device, the electronic device comprising a fingerprint sensor. The fingerprint sensor is typically comprised with a user input device providing a possible compliment and/or addition to a general user input device provided with the portable electronic device. Advantages with the invention include simplified user control of the portable electronic device.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1B:
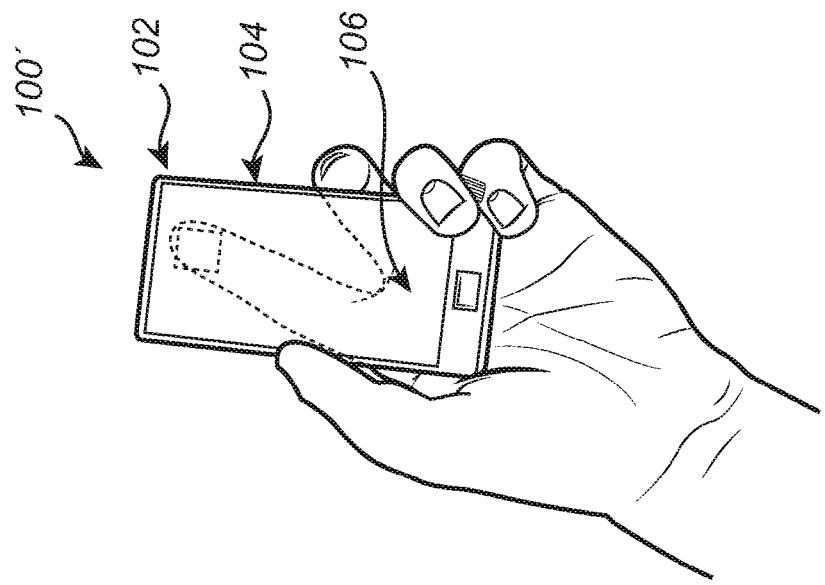
FIGS. 1a and 1b schematically exemplifies embodiment of the electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1A:
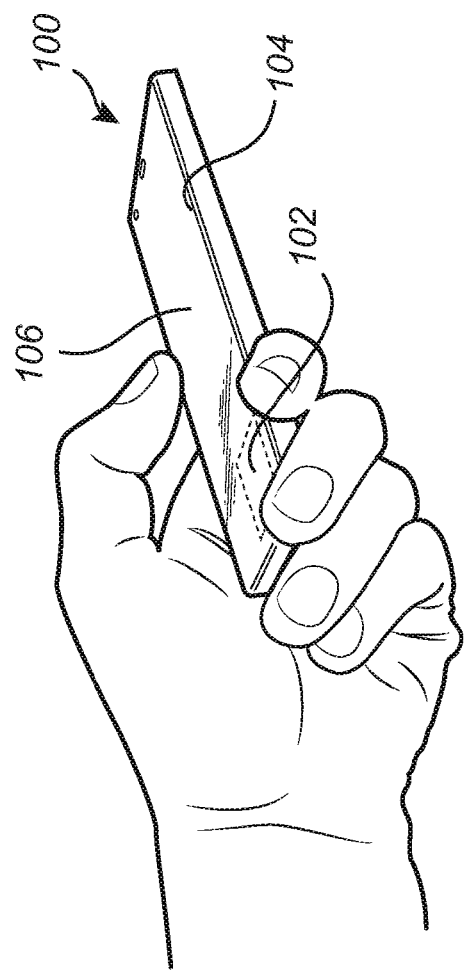

Turning now to the drawings and to FIG. 1a in particular, there is schematically illustrated an example embodiment of the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone, etc. Further functionality provided using the fingerprint sensor 102 will be discussed below.

FIG. 1b schematically illustrates an alternative embodiment of the electronic device according to the present invention, where the display unit 104 is still arranged at the front side of the mobile phone 100', having the fingerprint sensor 102 alternatively arranged at the backside of the mobile phone 100'.

Preferably and as is apparent for the skilled person, the mobile phone 100/100' shown in FIGS. 1a and 1b further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
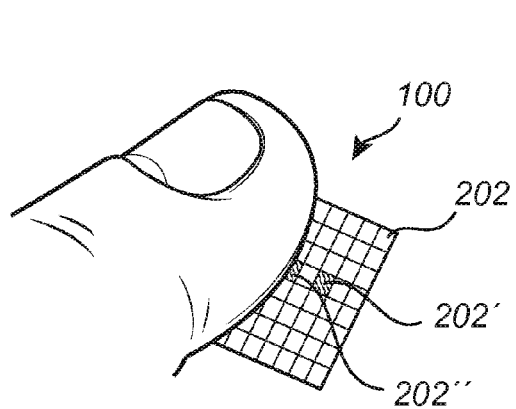
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The sensing elements may for example be arranged as sets of sensing elements, where such a set for example may comprise 8×8 sensing elements (also denoted as pixels). Such an exemplary set of sensing elements is in FIG. 2 indicated by reference numeral 202.

In an embodiment of the invention, a single or a plurality of sets of sensing elements 202 may be specifically configured for detecting the presence of human skin. For example, in the illustrated embodiment shown in FIG. 2, two centrally arranged sets of sensing element 202' and 202" are configured for providing such functionality (may of course be arranged anywhere within the two-dimensional area of the fingerprint sensor 102). The pixel value output of each of the sets of sensing elements 202', 202" may be combined, for example as a sum of the 8×8 pixel values. The sum from one of such a set of sensing elements 202', 202" can in turn be compared to a predetermined threshold, and in case the sum is larger than the threshold this may be taken as an indication as to the presence of human skin, thus resulting in the generation of the previously discussed human activity signal to be provided to the control unit.

Figure 3:
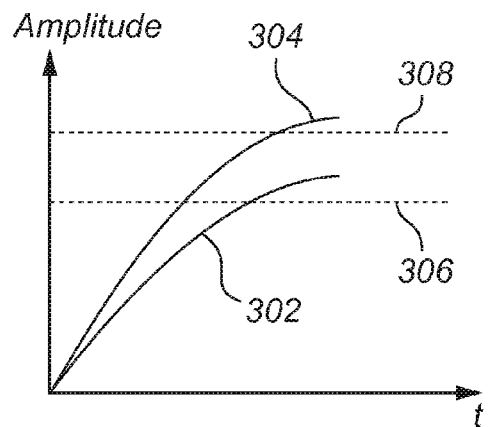
FIG. 3 is a diagram exemplifying a comparison between combined output results from sets of sensing elements of the fingerprint sensor in FIG. 2 when compared to predefined thresholds.

With further reference to FIG. 3, the sum from a single one of the sets of sensing elements 202', 202" is indicated as changing over time with reference numeral 302. Additionally, it may also be possible to combine the sum of pixel values from more than one single sets of sensing elements 202', 202", for example as indicated by reference numeral 304. As such, the sum 302 from one single set of sensing elements may be compared to a first threshold 306 and the combined sum 304 from more than one single set of sensing elements may be compared to second threshold 308.

Figure 4:
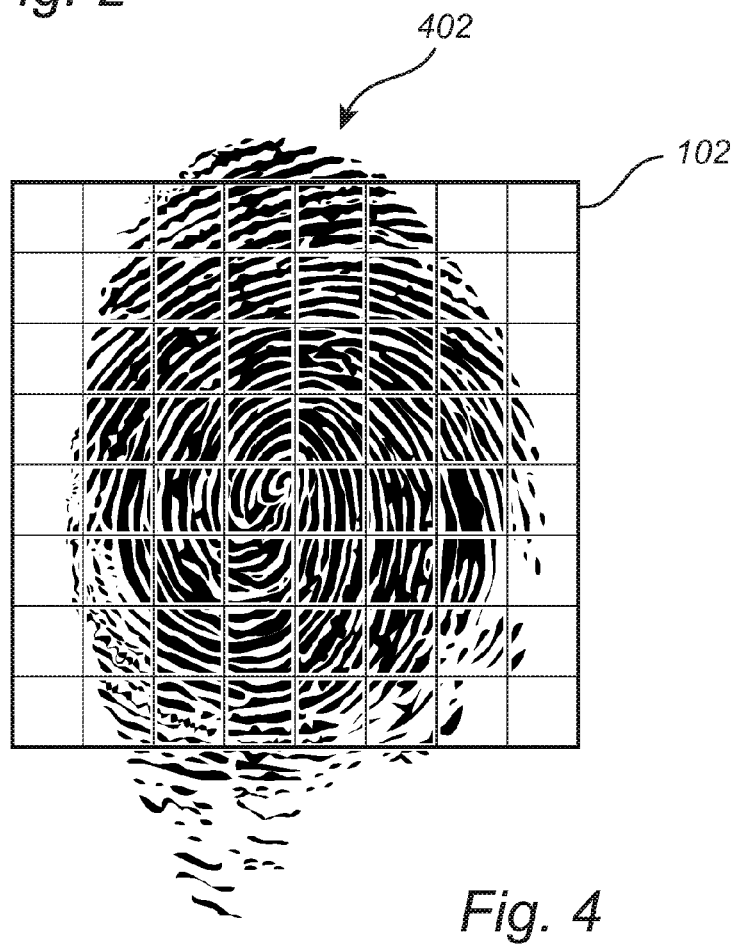
FIG. 4 illustrates an example of a fingerprint image captured using the fingerprint sensor in FIG. 2.

Turning now to FIG. 4 which illustrates an example of a fingerprint image 402 captured using the fingerprint sensor 102. The fingerprint sensor 102 is capable of sensing surface relief of human skin, and will provide a pixel based image for further processing for the purpose of extracting a verification representation to be compared to a pre-stored fingerprint template. For determining a composite direction of movement across the fingerprint sensor 102, the control unit will control the fingerprint sensor 102 to successively capture fingerprint images 402 comprising ridges and valleys of the user's fingerprint.

In an embodiment of the invention, the control unit will be configured to analyze at least two temporally different images to determine movement of the fingerprint in X- and Y-directions parallel to a plane defined by the surface of the fingerprint sensor 102. The control unit will subsequently compute X- and Y-displacement values corresponding to the movement of the fingerprint between the at least two temporally different images. In turn, the X- and Y-displacement values are used for controlling the operation of the GUI shown on the display unit 104 of the mobile phone 100/100', for example by adjusting the position of a pointer shown on within the GUI. It should be noted that the fingerprint sensor 102 in combination with the control unit may be configured to also detect changes in pressure of the fingerprint on the surface of the fingerprint sensor 102 to identify a mouse click command by the user, a command that subsequently may be used for controlling selected portions of the GUI responsive to such a command. Additionally, the detection of pressure may also possibly be used for indicating a displacement value in a third (Z) dimension, collectively providing X-, Y- and Z-displacement values.

Figure 5A:
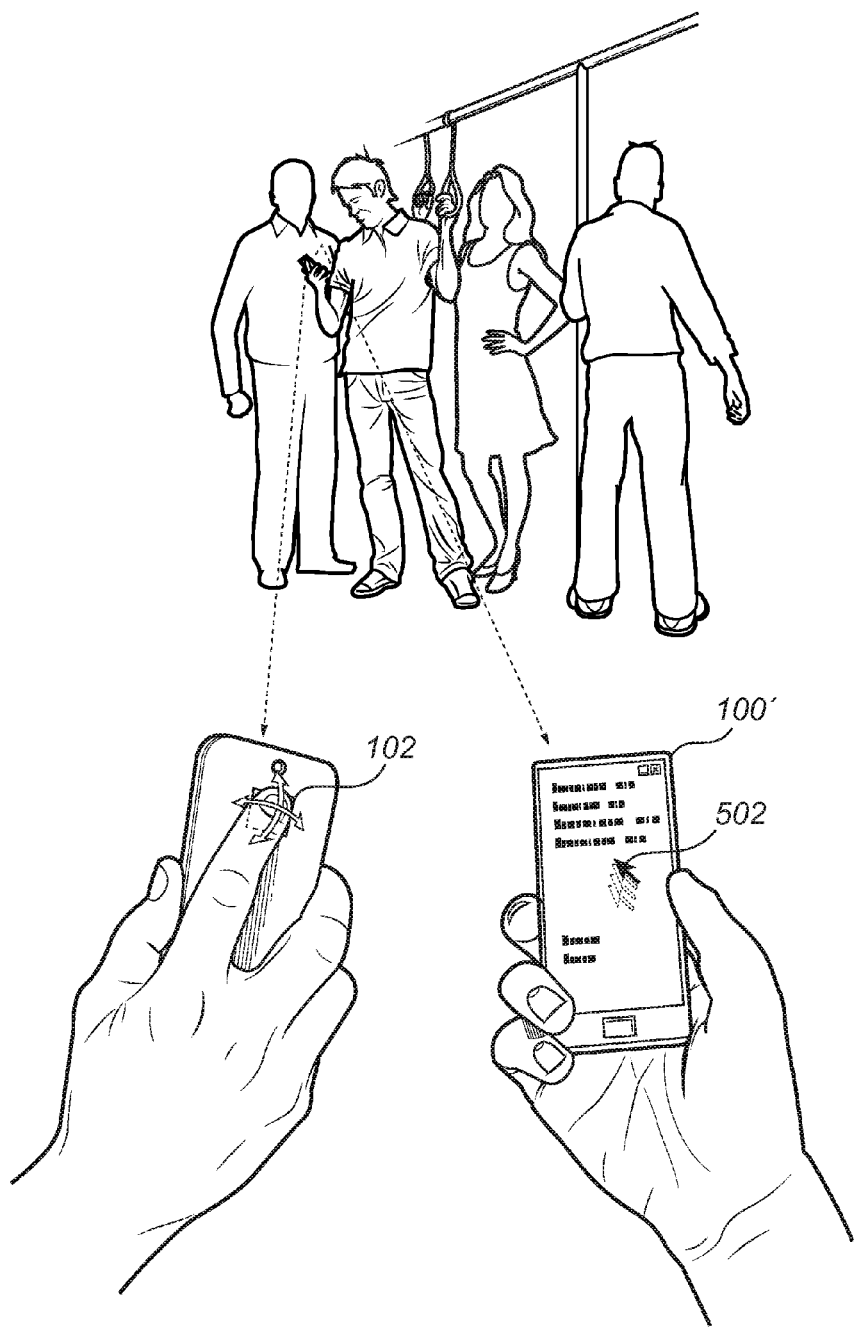
FIGS. 5a-5c illustrates possible embodiments of GUI control using a fingerprint sensor.
Figure 5B:
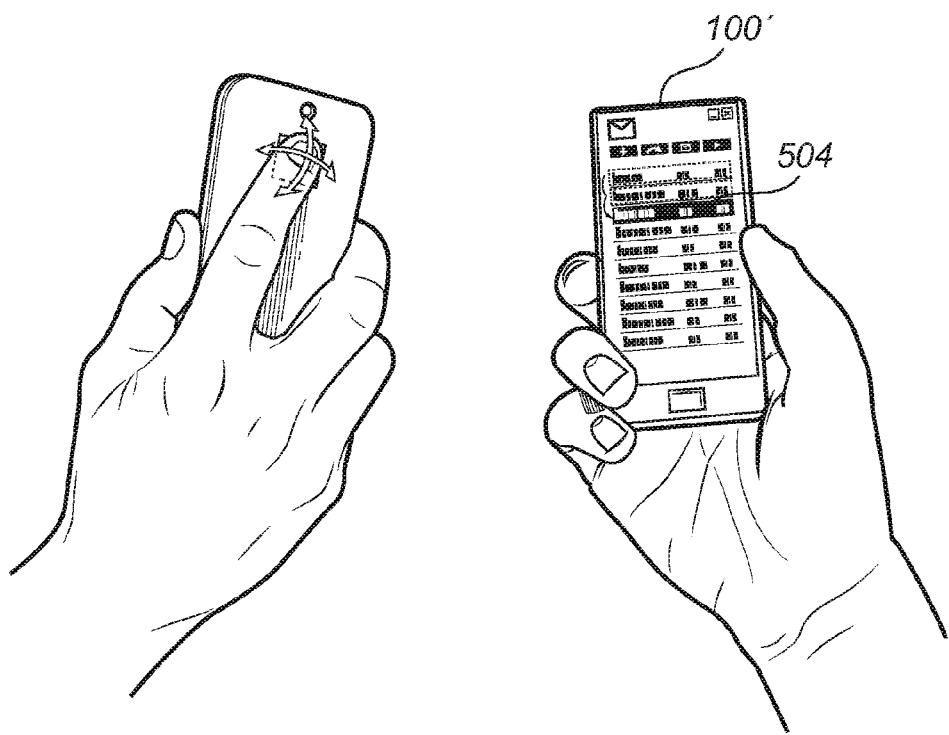
Figure 5C:
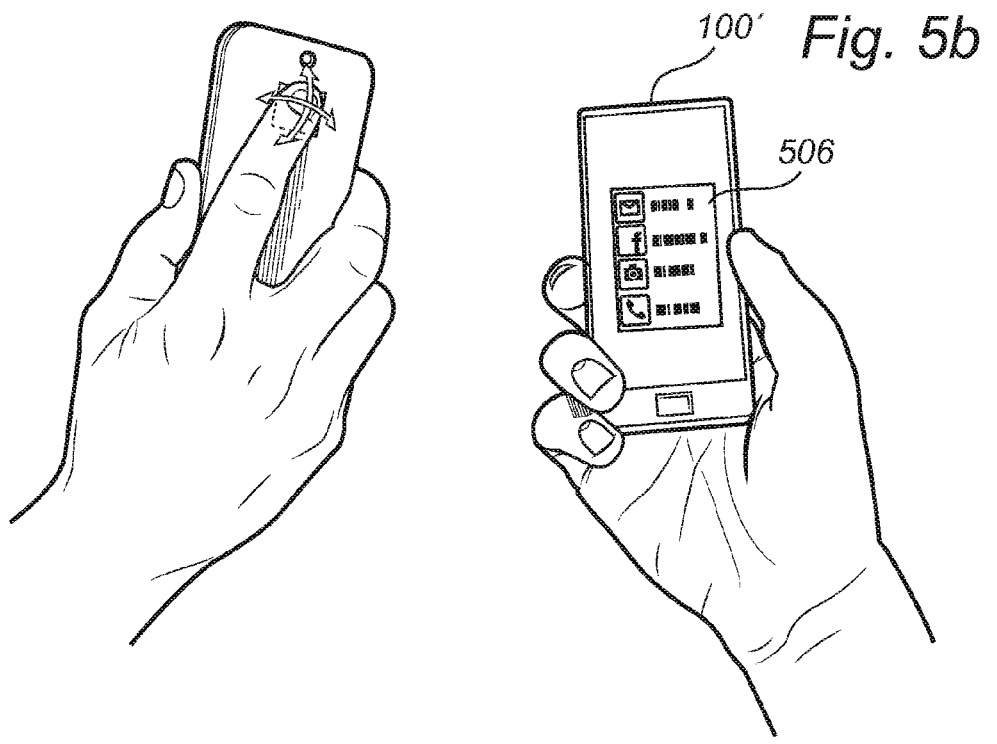

FIGS. 5a-5c provide examples of controlling the GUI using the fingerprint sensor 102, by the user moving his finger over the surface of the fingerprint sensor 102. In the exemplified embodiment specifically shown in FIG. 5a, the user is in a situation where a "one hand" control of the mobile phone 100' is desirable, and hence the fingerprint sensor is preferably arranged at the back of the mobile phone 100'. In this embodiment (FIG. 5a), the exemplified application (App) shown is a web browser. Accordingly, the typical GUI control of such an application, i.e. the context of the application, may make it desirable to provide a pointer 502, for example simplifying the process of clicking an available link within a web page. Alternatively, with reference to FIG. 5b, in relation to another application such as a mail client, it may be preferred to instead use navigation arrows. The navigation arrows may be explicitly visualized as GUI overlay within the mail client. However, the functionality of using navigation arrows may also be implicit, such as stepping through a list 504 of emails. In any case, the implicit navigation of the list 504 or the explicit connection with the navigation arrows is provided by movement of the finger over the fingerprint sensor 102 as discussed above.

In a further embodiment of the invention, once it has been decided that the second user input device comprising the fingerprint sensor 102 should be used for controlling the GUI, it may also be possible to visualize a second GUI 506 specifically adapted for control using the fingerprint sensor 102. Such a second GUI 506 may be provided separately within a specifically adapted application for example comprising a short list of links to other frequently used applications (e.g. a Facebook app, a web browser, a camera app, a caller app). Alternatively, the second GUI 506 may be provided as an overlay to the general GUI provided for controlling the currently visualized application.

Figure 6:
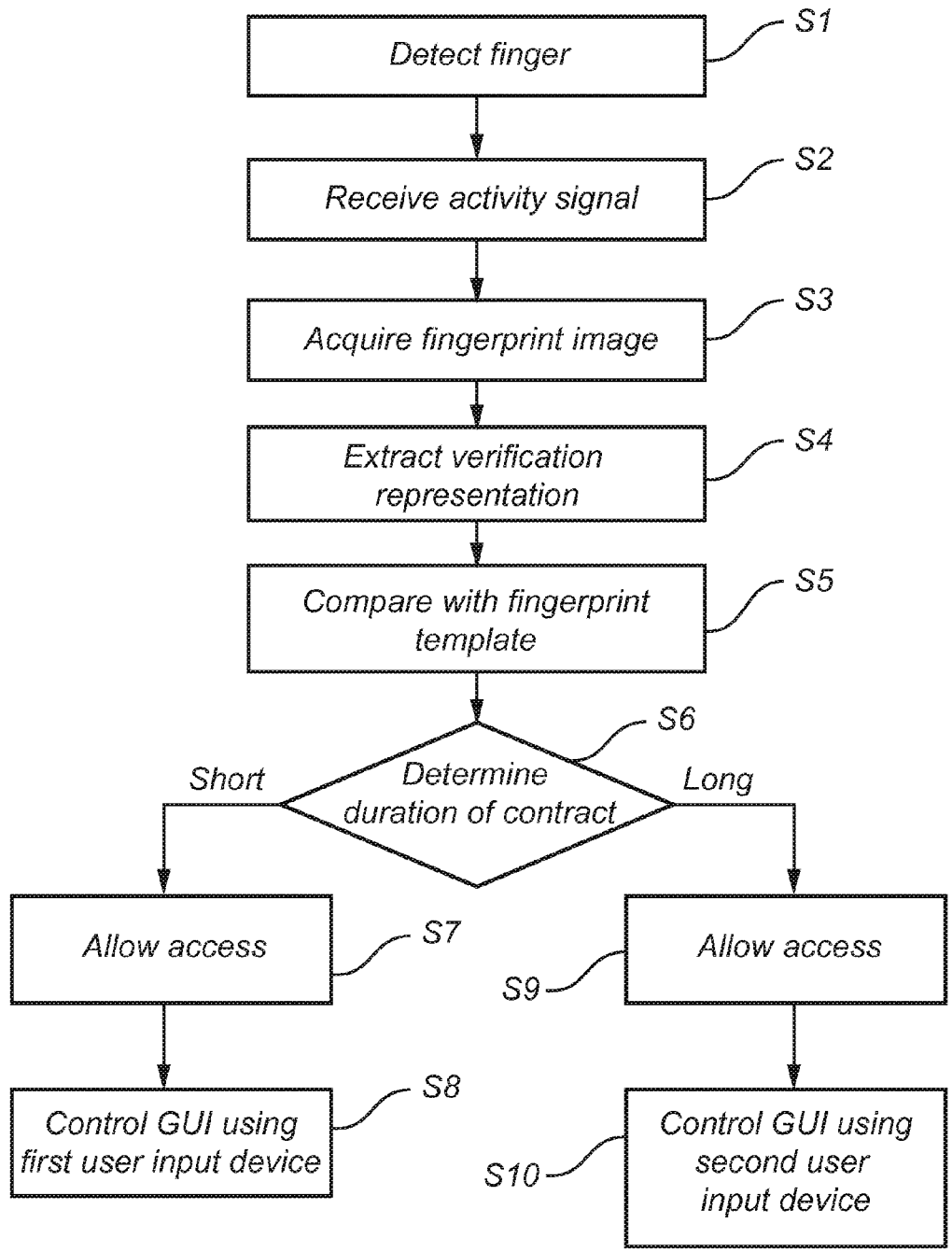
FIG. 6 is a flowchart illustrating the operation of the electronic device according to the present invention.

Turning finally to FIG. 6 which shows an exemplary general operation of the inventive portable electronic device, such as the mobile 100/100'. Typically, the process starts by the control unit being in a stand-by mode, such as a mode adapted for low power consumption. Once a user is positioning a finger on the surface of the fingerprint sensor 102, at least one of the sets of sensing elements 202', 202" finds contact with the human skin such that a sum of the pixel values from the one set of sensing elements eventually becomes larger than a predetermined threshold 306/308, i.e. a finger is detected, S1. In an embodiment of the invention, only the defined sets of sensing elements 202'/202" are active, i.e. the remaining part of the array of pixels of the fingerprint sensor 102 is deactivated, e.g. typically during the low power mode.

Following the pixel sum being higher than the threshold 306/308, a human activity signal is generated and provided to the control unit. The control unit receives, S2, the human activity signal and transitions the control unit, for example following an initiated interrupt routine, to a fully operational mode. Once in the fully operational mode the control unit activates the full array of pixels of the fingerprint sensor 102 and acquires, S3, a fingerprint image 402. Based on the fingerprint image 402, a verification representation is extracted, S4. The verification representation is then compared, S5, to a pre-stored fingerprint template. The fingerprint template may be stored locally at an electronic memory element of the mobile phone 100/100', or may be acquired from a remote location providing secure storage of fingerprint templates.

If the comparison between the verification representation and the fingerprint template is a match, the fingerprint sensor 102 is used for repeated detection of human skin for determine, S6, a duration of contact. If the duration of contact is, in comparison, short, such as below 2 seconds, the mobile phone 100/100' will be made accessible, S7, to the user and the user will be allowed to interact, S8, with a GUI of the mobile phone 100/100' using the first user input device, such as a touch screen 106 provided with a display unit 104 of the mobile phone 100/100'.

However, if the duration of contact is, in comparison, long, such as for example equal to or above 2 seconds (please note, the indicated duration is just an example indicating a possible implementation), the mobile phone 100/100' will similarly be made accessible, S9, to the user and the user will be allowed to interact, S10, with the GUI of the mobile phone 100/100' using the second user input device. The interaction using the second user input device is achieved by repeatedly acquiring fingerprint images 402 using the fingerprint sensor 102 and comparing successively acquired fingerprint images 402 to detect a direction of movement over the fingerprint sensor 102. In a possible embodiment of the invention, the location of specific ridges and pores of a fingerprint is computed from the fingerprint image 402, and movement of these specific ridges and pores will relate to an X- and Y-displacement of the finger at the surface of the fingerprint sensor 102. The X- and Y-displacement may accordingly in turn be used for control of a GUI provided on the display unit 104 of the mobile phone 100/100'.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A method of controlling a portable electronic device, the electronic device comprising a display unit configured to display a first graphical user interface (GUI), a first user input device configured to allow a user to interact with the first GUI, a second user input device comprising a fingerprint sensor having an array of pixels, the second user input device being separate from the first user input device, and a control unit configured to control the operation of the fingerprint sensor, wherein the method comprises the steps of:

detecting presence of human skin using the second user input device, wherein a positive detection results in a human activity signal;

receiving, at the control unit, the human activity signal;

acquiring, in response to the received human activity signal, a fingerprint image using the fingerprint sensor;

extracting a verification representation of the fingerprint image;

comparing the verification representation to a pre-stored fingerprint template;

when the comparing step results in a match:

repeatedly detecting presence of human skin at the second user input device to determine duration of contact, when the duration of contact is determined to be shorter than a predefined time:

allowing access to the portable electronic device, and allowing the user to interact with the first GUI using the first user input device, when the duration of contact is determined to be longer than the predefined time:

allowing access to the portable electronic device, and allowing the user to interact with the first GUI using the second user input device by repeatedly acquiring fingerprint images using the fingerprint sensor and comparing successively acquired fingerprint images to detect a direction of movement over the fingerprint sensor.

2. The method according to claim 1, wherein the control unit when receiving the human activity signal transitions from a first state of low power consumption to a second operational state.

3. The method according to claim 1, wherein the human activity signal is configured for initiating an interrupt routine within in the control unit.

4. The method according to claim 1, wherein the predefined time may be configured by the user operating the portable electronic device.

5. The method according to claim 1, further comprising the step of providing a second GUI configured for interaction with the second user input device, the second GUI provided as an element of the first GUI.

6. The method according to claim 5, wherein the second GUI is context adapted depending on an application requiring user input.

7. The method according to claim 5, wherein the second GUI is provided as an overlay in relation to the first GUI.

8. A portable electronic device, comprising:

a display unit configured to display a first graphical user interface (GUI);

a first user input device configured to allow a user to interact with the first GUI;

a second user input device comprising a fingerprint sensor having an array of pixels, the second user input device being separate from the first user input device, and a control unit electrically connected to the fingerprint sensor, wherein the control unit is configured to:
receive a human activity signal in response to human skin being detected at the second user input device;
acquire, in response to the received human activity signal, a fingerprint image using the fingerprint sensor;
extract verification representation of the fingerprint image;
compare the verification representation to a pre-stored fingerprint template;
determine duration of contact, when the comparison results in a match, in response to human skin repeatedly being detected at the second user input device;
when the duration of contact is determined to be shorter than a predefined time:
allow access to the portable electronic device, and
allow the user to interact with the first GUI using the first user input device,
when the duration of contact is determined to be longer than the predefined time:
allow access to the portable electronic device, and
allow the user to interact with the first GUI using the second user input device by repeatedly acquiring fingerprint images using the fingerprint sensor and comparing successively acquired fingerprint images to detect a direction of movement over the fingerprint sensor.

9. The portable electronic device according to claim 8, wherein the fingerprint sensor employs capacitive sensing technology.

10. The portable electronic device according to claim 8, wherein the control unit is further configured for general operation of the portable electronic device.

11. The portable electronic device according to claim 8, wherein at least one sub-set of the pixels of the fingerprint sensor is configured for detection of human skin for generating the human activity signal.

12. The portable electronic device according to claim 8, wherein the fingerprint sensor comprises at least 192×192 pixels.

13. The portable electronic device according to claim 8, further comprising means for data communication, wherein the fingerprint template is stored remotely from the portable electronic device and acquired from the remote location for comparison with the verification representation.

14. The portable electronic device according to claim 8, wherein the portable electronic device is a mobile phone.

15. A computer program product comprising a non-transitory computer readable medium having stored thereon computer program means for a control unit adapted for controlling a portable electronic device, the portable electronic device comprising a display unit configured to display a first graphical user interface (GUI), a first user input device configured to allow a user to interact with the first GUI, a second user input device comprising a fingerprint sensor having an array of pixels, the second user input device being separate from the first user input device, and a control unit configured to control the operation of the fingerprint sensor, wherein the computer program product comprises:
code for detecting presence of human skin using the second user input device, wherein a positive detection results in a human activity signal;
code for receiving, at the control unit, the human activity signal;
code for acquiring, in response to the received human activity signal, a fingerprint image using the fingerprint sensor;
code for extracting a verification representation of the fingerprint image;
code for comparing the verification representation to a pre-stored fingerprint template;
code for, when the comparing step results in a match:
repeatedly detecting presence of human skin at the second user input device to determine duration of contact,
code for, when the duration of contact is determined to be shorter than a predefined time:
allowing access to the portable electronic device, and
allowing the user to interact with the first GUI using the first user input device,
code for, when the duration of contact is determined to be longer than the predefined time:
allowing access to the portable electronic device, and
allowing the user to interact with the first GUI using the second user input device by repeatedly acquiring fingerprint images using the fingerprint sensor and comparing successively acquired fingerprint images to detect a direction of movement over the fingerprint sensor.

* * * * *